United States Patent [19]
Kummer et al.

[11] Patent Number: 4,706,079
[45] Date of Patent: Nov. 10, 1987

[54] RASTER SCAN DIGITAL DISPLAY SYSTEM WITH DIGITAL COMPARATOR MEANS

[75] Inventors: David A. Kummer, Boca Raton; Jesus A. Saenz, Coral Springs; Stephen W. Trynosky, Boca Raton, all of Fla.

[73] Assignee: International Business Machines Corporation, Armonk, N.Y.

[21] Appl. No.: 523,916

[22] Filed: Aug. 16, 1983

[51] Int. Cl.$^4$ .............................................. G09G 1/16
[52] U.S. Cl. .................................... 340/799; 340/798; 340/744
[58] Field of Search ............... 340/799, 750, 744, 747, 340/748, 798, 803

[56] References Cited

U.S. PATENT DOCUMENTS

| | | | |
|---|---|---|---|
| 4,401,985 | 8/1983 | McVey et al. | 340/799 |
| 4,408,200 | 10/1983 | Bradley | 340/799 X |
| 4,439,760 | 3/1984 | Fleming | 340/799 |

Primary Examiner—Gerald L. Brigance

[57] ABSTRACT

In a bit mapped raster scan digital display system, a number of maps each contain a single component of the display data and are read together to provide sets of bytes, each set representing eight pel defining groups. A compare system is provided for determining when a pel group in a set of bytes compares with a reference pel defining group. For the, or each, pair of maps, the compare system compares all bits of the two bytes of data with the associated bit of the reference group to provide outputs when a corresponding bit in each of the bytes compares with the two reference bits. When more than two maps are employed the compare outputs related to all of the pairs of maps are combined to provide an output signal when a pel group in a byte from the maps compares with the reference bits. In a modification of the system the comparison can be made between one or more of the maps and the corresponding bit or bits of the compare data.

5 Claims, 3 Drawing Figures

RASTER SCAN DIGITAL DISPLAY SYSTEM WITH DIGITAL COMPARATOR MEANS

DESCRIPTION

1. Technical Field

The present invention relates to raster scan digital display systems, and in particular to such systems employing bit maps in which data for display is stored in a bit pattern corresponding to the picture element pattern of the display, and the pattern is read sequentially in correspondance with the display scanning to generate display drive signals.

2. Background Art

Bit mapped digital display systems are well known. An example of such a system is described in an article entitled 'Computer Graphics in Color' by P. B. Denes in the Bell Laboratories Recored, May 1974, at pages 139 through 146. In that article, it is stated that the computer stores the codes for successive points in successive locations in a buffer memory, and a suitable scan interface circuit reads the buffer memory and generates a video signal. It is also mentioned that a color picture is produced by generating three separate color signals for each single video signal.

Another example of a bit mapped digital display system is shown in U.S. Pat. No. 4,070,710 (Sukonick). The system described therein is essentially designed for a monochrome display, using a single bit map. There is, however, an arrangement described in which two bit maps are read together to produce color signals.

In certain applications, it is desirable to compare a stored color code or a multi-bit monochrome code with a reference code. One example is in a color display system in which a figure, such as a circle, is to be displayed in one color on a background of another color and then filled with a solid color. In order to do this, the digital signals for each scan line must be compared with the color of the figure firstly as the scan line enters the figure, and then as it leaves it. From this information, of course, the position and length of the portion of the scan line to be filled can be determined. This comparing operation clearly has other uses, such as in automatic image recognition in which particular patterns on a display are compared with known patterns.

In a bit mapped display system using multiple memories which are only accessible in byte-wide portions, the C.P.U. coupled to a display system is normally required to read a data byte from each memory and use bit manipulation instructions or individual bit testing to find data groups of four bits (when four memories are used) each from a different memory. As C.P.U.'s normally operate on data of at least one byte length, these bit manipulation or individual bit testing operations are excessively time consuming.

It is, therefore, an object of the invention to provide, in a raster scan display system, means for comparing sets of picture element (pel) data with a reference data set without using separate bit manipulation or individual bit testing techniques.

DISCLOSURE OF THE INVENTION

The present invention provides a comparator system for use in a raster scan digital display system for comparing n-bit pel data with n-bit reference data. The n-bit pel data is received by the comparator as groups of m×n bits, where m may be, for example an eight bit byte. The comparator is operable to effect a comparison on the corresponding n bits in each group of m and to provide an indication of equality or inequality between any one of the n bit groups and the n-bit reference data.

BEST MODE FOR CARRYING OUT THE INVENTION

Figure 1:
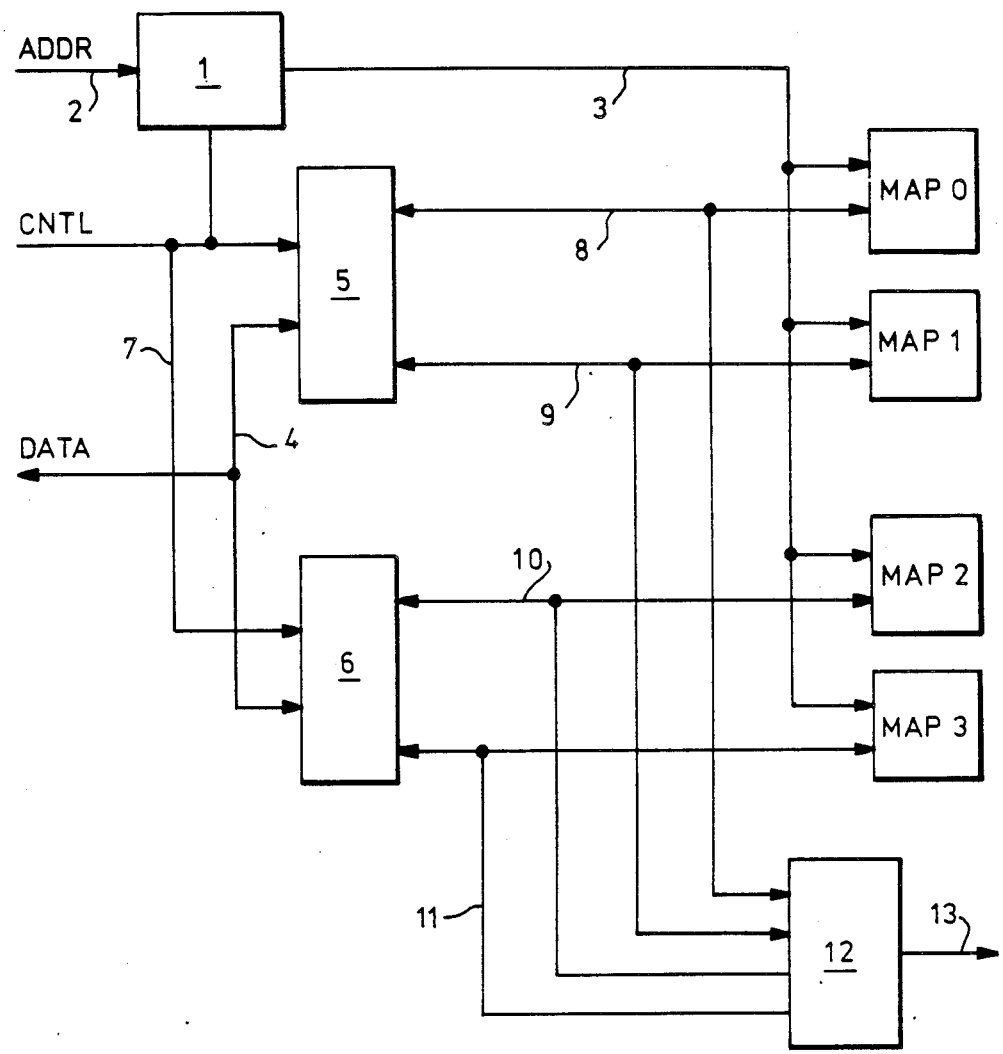
FIG. 1 is a simplified block diagram of a multi-plane bit mapped digital raster scan display system.

FIG. 1 is a block diagram of a digital raster scan display system limited in detail, for simplicity, to the major components thereof and the major data flow paths. The system couples to a host C.P.U., for example a microprocessor, by an address bus 2, a control bus 7 and data bus 4. Four memories MAP0 through MAP3 are provided, these may, for example, be dynamic random access memories, and are addressed for read, write and refresh operations by an address unit 1. The capacity of each memory is, for example 64K bytes, and each is coupled to one of two graphics controllers 5 and 6 by one of data input/output busses 8, 9, 10 and 11. The graphics controllers control data flow between the memories and the C.P.U. via C.P.U. data bus 4. They also effect data manipulation operations, including the compare operation to be described later, on data written into, or read from the memories. Each memory is arranged to store a bit map comprising one component of each pel to be displayed. This data is accessed in bytes each representing one component of eight consecutive pels. The stored data is laid out such that adjacent locations are addressed in sequence to provide the data for sequantially scanned pels. To provide the display signals, corresponding locations in each of the memories are accessed together to apply four bytes of data, one from each memory, to C.R.T. drive circuit 12. In drive circuit 12, the bytes are serialized to provide sequential sets of four parallel bits, one from each byte. Each set of four bits defines the characteristic of a displayed pel. For example, MAP0 may contain red, MAP1 green, MAP2 blue, and MAP3 attribute component data for each pel. From this data, the C.R.T. drive signals are developed on output lines 13. It is, of course, clear that the system may be used for a monochrome display, with the memory data representing, in the four bit combinations, different intensity levels for the display.

Figure 2:
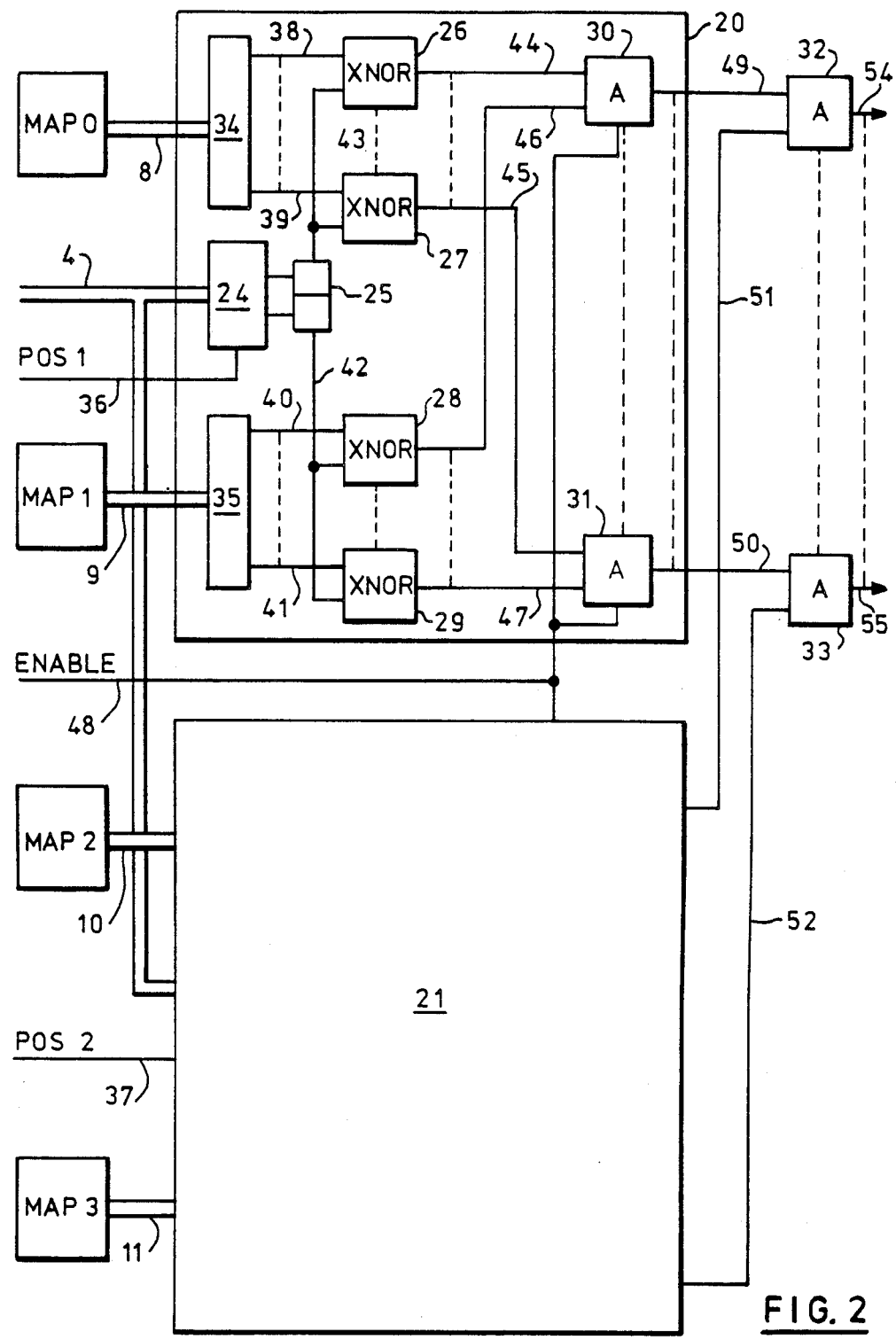
FIG. 2 is a logic diagram of a comparator employed in the FIG. 1 system.

FIG. 2 shows a color compare system which forms a part of the graphics controllers 5 and 6 of FIG. 1. It should be noted that the term 'color compare' is used herein for convenience, it being clear that if the system is used for monochrome display, the comparison is made between intensity representing data. The object of the color compare system is to compare color data from the C.P.U., received over bus 4 with color data from MAP0 through MAP3. It will be remembered that, though the memory data is retrieved in bytes, the actual color information for each displayed pel comprises 4 bits, one from each byte from the memories. Thus, any direct byte-by-byte comparison with C.P.Y. data is meaningless. However, to ensure minimum delay, byte transfer and manipulation is highly desirable.

In FIG. 2, block 20 is in graphics controller 5, and block 21, whose components are identical to those of block 20 and are, therefore not shown, is in graphics controller 6. Let us assume that a byte of data is read from each of the memories MAP0 through MAP3. These are passed over busses 8 through 11 to respective registers 34 and 35 in block 20 and data, including the data to be compared with the memory data, has been passed by the C.P.U. over bus 4 to a multiplexer 24 in box 20 and a similar multiplexer in box 21. This byte of data represents 4 bits of color information for four maps with 4 unused bits, which would be used if six or eight maps are employed. Each of the multiplexers is designed to select only two bits at any one time and pass these bits to a register, shown as register 25 in box 20. These two bits for multiplexer 24 are bits 0 and 1, selected by a signal on a POS1 line from the C.P.U., and for the other multiplexer, bits 2 and 3, selected by a signal on a POS2 line. Thus, the multiplexers select and pass on to their respective registers bits 0, 1, 2 and 3 of the C.P.U. compare byte. Bit 0 is now to be compared with the bits in the byte from MAP0, bit 1 with those from MAP1, bit 2 with those from MAP2 and bit 3 with those from MAP3. Referring now to box 20 in detail, each of eight lines 38–39 from the respective stages of register 34 are coupled as an input to a respective one of eight exclusive NOR circuits 26–27. These compare respective bits of the MAP0 byte from register 34 with the 0 position bit from register 25, the output of which is coupled in common to the XNOR circuits 26–27 through line 43. Similarly eight XNOR circuits 28–29 are coupled to register 35 through lines 40 and to register 25 through common line 42 to compare the 1 position bit from register 25 with the byte read from MAP1 to register 25. As is well known, an XNOR circuit provides a '1' output when its inputs are equal and a '0' output when they are not. Consequently any correspondance between a bit in register 34 and the 0 position bit in register 25 raises the corresponding one of eight lines 44–45. Similarly one or more of eight lines 46–47 are raised with correspondance between the bits in register 35 with the 1 position bit in register 25. Eight AND circuits 30–31 each receive the outputs of a corresponding pair of the XNOR circuits over the lines 44–45 and 46–47 as shown. On receipt of an enable signal from the C.P.U. over line 48, each of these AND circuits provides an output on its corresponding one of eight lines 49–50. A raised output on one of lines 49–50 indicates correspondance between an associated pair of correspondingly ordered bits from MAP0 and MAP1 and the two color compare bits in register 25. Similarly one or more of eight lines 51–52 are raised in accordance with the MAP2 and MAP3 data and the remaining two color compare bits.

To complete the color compare function, corresponding lines of the two sets 49–50 and 51–52 provide respective inputs to eight AND circuits 32–33 as shown. It should be noted that with open collector outputs from AND circuits 30–31, the AND circuits 32–33 may be simple dot-AND connections rather than transistor logic circuits. AND circuits 32–33 have eight output lines 54–55, and an output on any one of these lines indicates equality between all four bits of the color compare data and a corresponding four-bit pel data group within the eight such groups received as a byte from each of MAP0 through MAP3. Thus, if line 54 is activated, the first group (bit 0 of the bytes from MAP0 through MAP3) equals the color compare data, and if line 55 is activated the last group (bit 7 of the bytes from the maps) equals the color compare data. The eight lines 54–55 are coupled back to the CPU to provide the indications of equality.

Though a system employing four bit maps has been described, it is evident that a similar system using two bit maps may be constructed by using only the components in box 20, so that the outputs of AND gates 30–31 provide the output signals without the use of AND gates 32–33. Similarly, the system could be expanded to operate on six or eight bit maps by adding a circuit of the type in box 20 for each additional pair of maps used, and suitably modifying the output circuits from the boxes to the output lines. By using identical logic to service each pair of maps, the number of distinct LSI designs required to service different numbers of these maps is clearly decreased.

Figure 3:
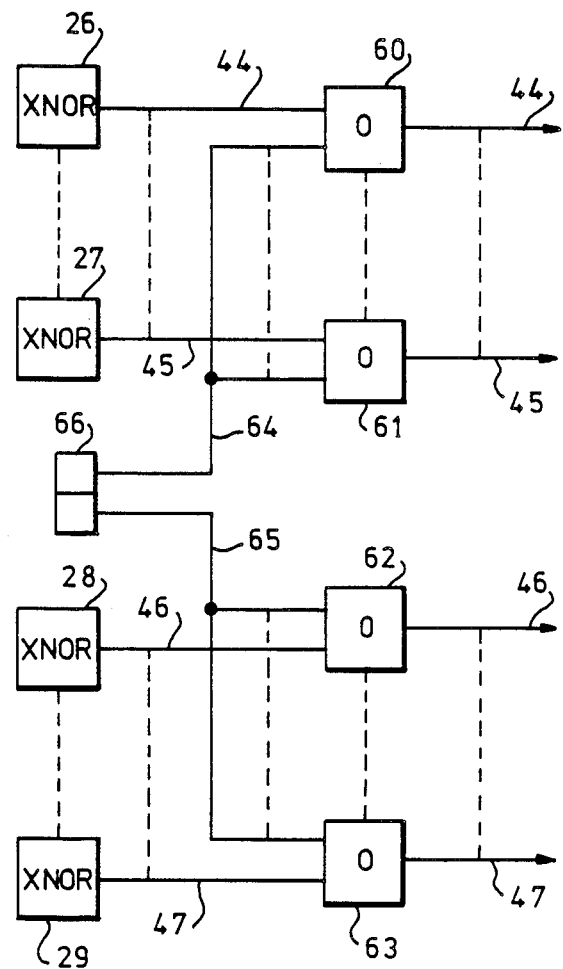
FIG. 3 shows a modification of the logic of FIG. 2.

FIG. 3 is a logic diagram showing a modification of the arrangement shown in FIG. 2. FIG. 3, shows certain components of block 20 in FIG. 3, all of which have the same reference numerals in both figures. In FIG. 3, the FIG. 2 circuit is modified by the inclusion of eight OR circuits 60–61 in the output lines 44–45 of XNOR circuits 26–27 and a further eight OR circuits 62–63 in the output lines 46–47 of XNOR circuits 28–29. Each of the OR circuits 60–61 also receives an input in common from one stage of a register 66 over a line 64. Similarly each of the OR circuits 62–63 receives an input in common from the other stage of register 66 over a line 65. It should be noted that block 21 in FIG. 2 includes a similar arrangement of a two stage register coupled to OR circuits.

The purpose of the modified arrangement is to permit the comparison of data from only a selected one, or ones, of the maps with the color compare data. This is achieved by defining the map or maps which will not figure in the comparison operation. Register 66 and its equivalent in block 21 (FIG. 2) are loaded from the C.P.U. The upper stage of register 66 is associated with the data from MAP0 and its lower stage with the MAP1 data. A '1' bit in the upper stage results in a '1' bit output from all of the eight OR circuits 60–61 irrespective of the outputs of XNOR circuits 26–27. Similarly a '1' bit in the lower stage provides '1' bit outputs on lines 46–47 irrespective of the outputs from XNOR circuits 28–29. Thus, whenever a '1' bit appears in a stage of register 66 and its equivalent in block 21 (FIG. 2), then the logic system provides outputs, in response to inputs from the corresponding maps, which always indicate equality with the corresponding color compare bits. Thus, by appropriately loading these registers, the color compare operation can be made between the data from any one, two, three or all of the maps and the color compare data.

In summary, what has been described is a color compare system in which groups of n bit pel data are compared with an n bit color compare group. The groups of pels are derived from n bit-mapped memories, each of which supplies m parallel bits representing one order of the n bit pel data for m consecutive pels. The system effects comparison of the m×n bits with the color compare group in one operation.

While the invention has been shown and described with reference to a particular preferred embodiment thereof, it will be understood by those skilled in the art that various changes in form and detail may be made without departing from the spirit and scope of the invention.

We claim:

1. A rather scan digital display system including an even number, n, of bit map memories, means for simultaneously retrieving data from corresponding locations in each of the bit map memories in parallel groups of m bits, means for serializing the groups to form serial streams of parallel n bit picture element (pel) defining groups, and a compare system for comparing said retrieving data with an n bit compare data group prior to serialization to detect equality between each bit of the compare group and corresponding bits of the retrieved data groups defining individual pels, said compare system comprising n stage register means for registering said n bit compare data group, n groups of m exclusive NOR circuits, each exclusive NOR circuit in a group having a first and a second input and an output, said first input being coupled to receive a respective bit of each retrieved data group from a bit map memory uniquely associated with the exclusive NOR circuit group, said second input being coupled together with second inputs of all the exclusive NOR circuits in the circuit group to a corresponding single stage of said register means, said compare system further including for individual pairs of groups exclusive NOR circuits, a group of m AND circuits each having first and second inputs coupled respectively to the outputs of corresponding exclusive NOR circuits in the corresponding pair of groups, and an output providing signals indicating correspondence between corresponding bits in retrieved data groups from the associated bit map memories and the corresponding compare data bits.

2. A raster scan display system according to claim 1 in which n is 4 and two of said groups of m AND circuits are coupled to the exclusive NOR circuits and including a further group of m AND circuits, each having first and second inputs coupled respectively to the outputs of corresponding individual AND circuits in said two groups coupled to the exclusive NOR circuits and an output providing signals indicating corrrespondence between bits of all of the simultaneously retrieved data groups and the associated bits of the compare data group.

3. A raster scan digital display system according to claim 1 in which said comparing means includes, for each exclusive nor circuit group, a register for registering each retrieved group of m bits from associated bit map memory, said first inputs of the exclusive NOR circuits in the group being coupled to respective stages of said register.

4. A raster scan digital display system according to claim 1 adapted to compare the data from fewer than said n bit map memories with said n bit compare data group comprising means for indicating the memories from which dasta is not be compared with the compare data, and logic means, responsive to the indicating means to provide a binary "1" indicating signal on each output of the exclusive NOR circuits in the groups corresponding to the indicated memories.

5. A raster scan digital display system according to claim 4 in which the indicating means comprises n stage register means, of which each stage corresponds to an associated bit map memory, and including n groups of m OR circuits corresponding to the n groups of m exclusive NOR circuits, in which each of the couplings between the exclusive NOR circuits and said of m AND circuits consists of a corresponding one of said OR circuits having a first input coupled to the exclusive NOR circuit output and an output coupled to the AND circuit input, second inputs of each OR circuit in a group being coupled together to a corresponding stage of the indicator register means whereby, when that stage is in a "1" binary state, all of the coupled OR circuits provide said binary "1" indicating signal irrespective of the outputs of the associated exclusive NOR circuits.

* * * * *

UNITED STATES PATENT AND TRADEMARK OFFICE
CERTIFICATE OF CORRECTION

PATENT NO. : 4,706,079
DATED : November 10, 1987
INVENTOR(S) : David A. Kummer et al It is certified that error appears in the above—identified patent and that said Letters Patent is hereby corrected as shown below:

Column 2, Line 63, delete "C.P.Y." and insert --C.P.U.--;

Column 3, Line 35, delete "." after "the";

Column 4, Line 18, delete "Fig. 3" and insert --Fig. 2--;

Column 5, Line 1, delete "rather" and insert --raster--;

Column 6, Line 6, delete "nor" and insert --NOR--;

Line 7, after "from" insert --the--;

Line 15, delete "dasta" insert --data--, after "not" insert --to--;

Line 26, after "said" insert --group--.

Signed and Sealed this

Sixteenth Day of January, 1990

*Attest:*

JEFFREY M. SAMUELS

*Attesting Officer*  *Acting Commissioner of Patents and Trademarks*